United States Patent [19]
Reynolds et al.

[11] Patent Number: 6,059,238
[45] Date of Patent: May 9, 2000

[54] SNAP-IN ARMREST

[75] Inventors: Gareth W. Reynolds, Novi; Dennis R. Venuto, St. Clair Shores; Virgil A. Iliescu, Southfield, all of Mich.

[73] Assignee: Prince Corporation, Holland, Mich.

[21] Appl. No.: 08/987,006

[22] Filed: Dec. 8, 1997

[51] Int. Cl.$^7$ .................................................. B68G 5/00
[52] U.S. Cl. ........................... 248/118; 16/229; 296/153; 297/411.2; 297/411.3; 297/411.32; 297/411.46
[58] Field of Search .................................. 248/118, 118.1, 248/118.5, 291.1; 296/153; 297/411.2, 411.21, 411.3, 411.32, 411.34, 411.46; 16/229, 254

[56] References Cited

U.S. PATENT DOCUMENTS

| | | | |
|---|---|---|---|
| 965,265 | 7/1910 | White | 16/229 |
| 1,022,632 | 4/1912 | Leigh | 297/411.21 |
| 1,628,030 | 5/1927 | Catlett | 248/118 |
| 3,994,140 | 11/1976 | Gunderson | 61/108 |
| 4,392,284 | 7/1983 | LePage | 24/265 B |
| 5,026,028 | 6/1991 | Ooi et al. | 248/291.1 |
| 5,274,882 | 1/1994 | Persson | 16/303 |
| 5,352,012 | 10/1994 | Chowdhury et al. | 297/113 |
| 5,490,305 | 2/1996 | Domingo Ribot | 16/229 |

*Primary Examiner*—Leslie A. Braun
*Assistant Examiner*—Debbie Short
*Attorney, Agent, or Firm*—Harness, Dickey & Pierce, P.L.C.

[57] ABSTRACT

An armrest mounting system in which one of an armrest mounting bracket or armrest includes spring-loaded pins and the other of the bracket and armrest includes apertures to receive the pins as the armrest is inserted into the mounting bracket. The pins extend into the associated aperture providing a pivotal interface between the armrest and mounting bracket.

19 Claims, 1 Drawing Sheet

SNAP-IN ARMREST

BACKGROUND OF THE INVENTION

The present invention relates to a vehicle armrest and particularly to an improved mounting structure therefor.

Many modern vehicles include center armrests which pivot between a raised stored position and a lowered use position for the comfort and convenience of the driver and/or passenger. Typically these armrests are mounted to a generally U-shaped bracket during assembly of the automobile which is either preassembled to the armrest and subsequently fastened to the underlying support structure for the vehicle or alternatively the armrest is mounted within the bracket once the bracket is installed in the vehicle. With either method, it is necessary to either deflect the bracket or otherwise provide additional structure for inserting and locking a pivot axle between the bracket and armrest, leading to additional parts expense and/or manufacturing costs. Thus, there exists a need for a mounting system for attaching an armrest to a mounting bracket easily during manufacturing of a vehicle which does not require special tools, skills or mounting structure.

SUMMARY OF THE PRESENT INVENTION

The system of the present invention satisfies this need by providing an armrest mounting system in which one of the armrest mounting bracket or armrest itself includes spring-loaded pins which snap-fit within mating apertures as the armrest is inserted into the mounting bracket, whereupon the pintles extend into the associated apertures providing a pivotal interface between the armrest and mounting bracket. Such a system, therefore, does not require special mounting hardware or skilled employees for the assembly of the armrest to the mounting bracket and further allows the removal of the armrest, if necessary, for repair or replacement. In a preferred embodiment of the invention, the armrest includes a cylindrical mounting member in which a compression spring is mounted urging opposed cylindrical pins extending outwardly therefrom. A generally U-shaped bracket is provided and has guide channels formed in communication with apertures in end legs for receiving the pintles of the armrest such that the armrest can be slideably fitted within the channels until the pivot pins spring-lock into the apertures of the bracket. Such a system, therefore, provides a readily assembled armrest for use in vehicles, such as automobiles, and one which is relatively inexpensive and can be removed for servicing if necessary.

These and other features, objects and advantages of the present invention will become apparent upon reading the following description thereof together with reference to the accompanying drawings.

DETAILED DESCRIPTION OF THE PREFERRED EMBODIMENT

Figure 1:
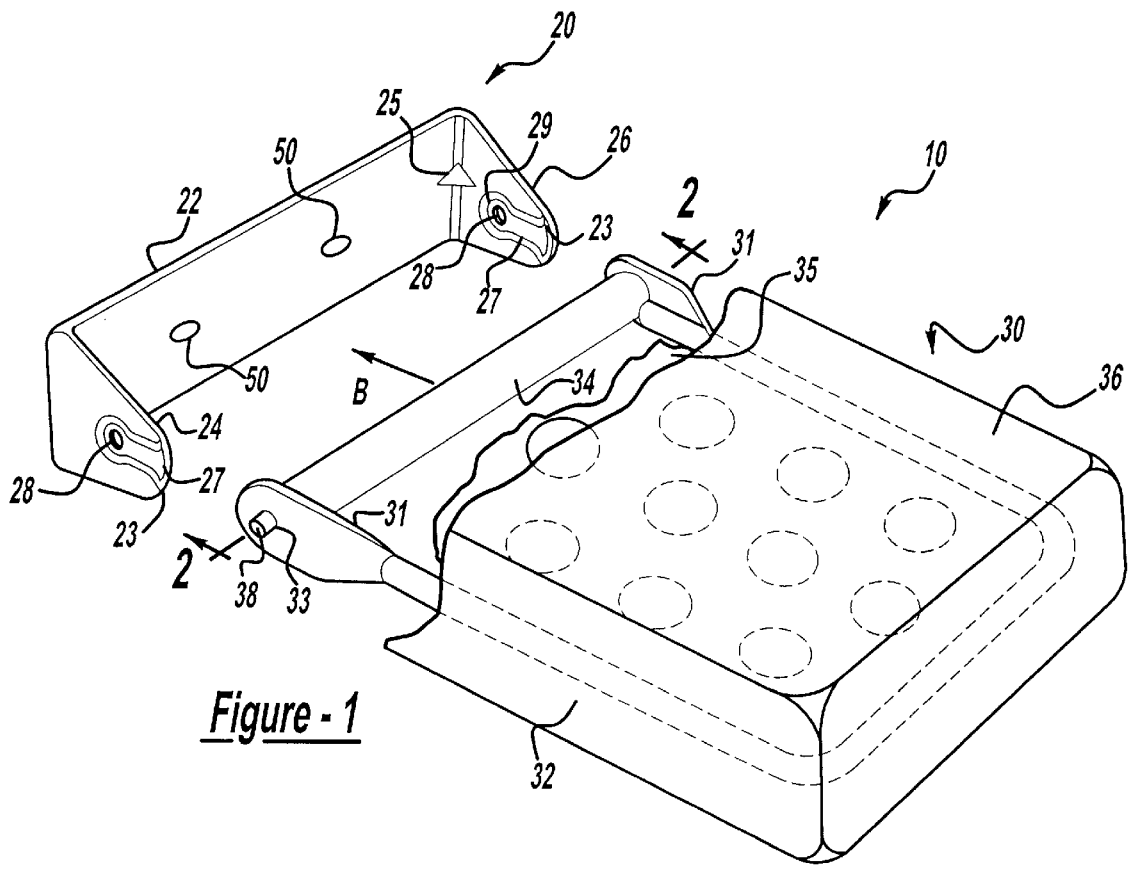
FIG. 1 is an exploded perspective fragmentary view of an armrest and mounting bracket according to the present invention.
Figure 2:
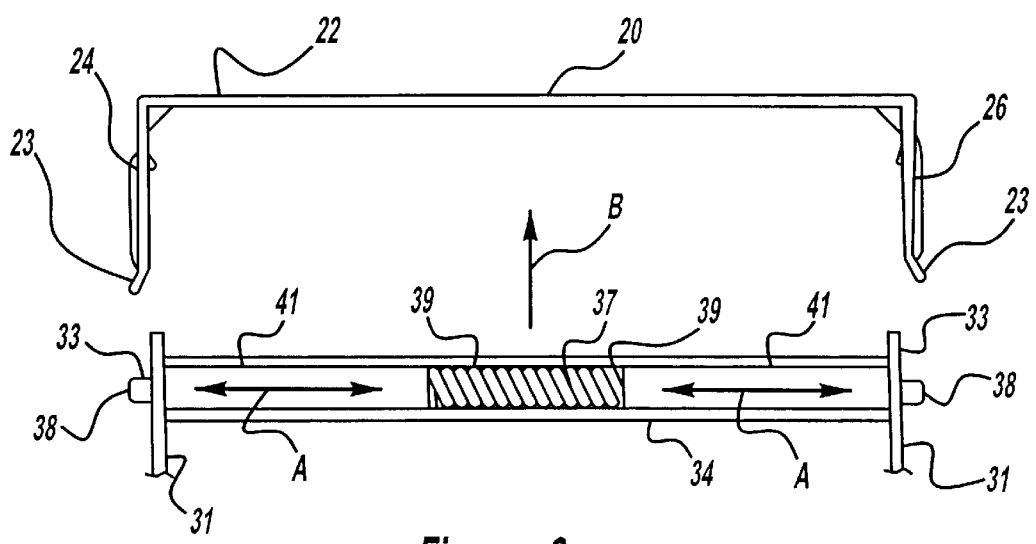
FIG. 2 is a fragmentary cross-sectional view taken along section lines II—II of FIG. 1.

Referring initially to FIG. 1, there is shown an armrest assembly 10 embodying the present invention which includes a generally U-shaped mounting bracket 20 and an armrest 30. The bracket 20 includes a base 22 having one or more apertures 50 for securing the base 22 to the floor or other structural support member of a vehicle, such as an automobile, utility vehicle, van or truck. Bracket 20 further includes upwardly or outwardly extending spaced-apart end legs 24 and 26 integrally joined to base 22 and which may include a structural fillet 25 on the intersection of the legs to the base for adding structural rigidity to the bracket. Each leg 24, 26 is formed to include an outwardly deflected tip 23 (as best seen in FIG. 2) communicating with a recessed channel 27 which extends from the tip toward base 22 and communicates with a circular aperture 28 formed in each leg 24, 26 for receiving a spring-loaded pin 38 extending from opposite sides of the armrest 30 as described in greater detail in connection with FIG. 2 below. Each of the legs 24, 26 further include stop tabs 29 extending from the legs at the side of the apertures 28 opposite channels 27 to facilitate the installation of the armrest 30 to bracket 20 as well as provide a vertical stop for the armrest when raised between a lowered use position and a raised stored position.

The armrest 30 comprises a generally rectangular frame including a U-shaped tubular section 32 which communicates with a cylindrical mounting tube 34 and is attached thereto by means of flanges 31 on opposite ends of tube 34 and which are welded or otherwise attached to the mounting tube 34. The frame is preferably made out of metal, although a structurally rigid polymeric material could likewise be employed. Extending over the frame in a conventional manner is a padded and upholstered material including a suitable polymeric foam cushion 35 covered by an upholstery material 36 which can be fabric, vinyl, leather or the like and which can be integrally formed over the frame 32 with the mounting tube 34 extending from an end of the armrest so formed. The spring-loaded mounting of the pins 38 in mounting tube 34 is best seen with reference to FIG. 2, now described.

In FIG. 2, it is seen that within the center of mounting tube 34 there is positioned a compression spring 37 which engages the inner ends 39 of a cylindrical extension 41 of each of the pins 38 urging the pins 38 outwardly through apertures 33 in the end flanges 31 of the armrest 30. Cylindrical members 41 can be hollow or solid polymeric or metal cylinders or rods, respectively, with integral end walls 39 and smaller diameter pins 38. The outer diameter of the enlarged cylindrical sections 39 of pins 38 is somewhat smaller than the inner cylindrical diameter of cylindrical mounting tube 34 such that the pins 38 can be readily compressed inwardly and urged outwardly in a direction indicated by arrows A in FIG. 2 with the pins 38 remaining centered with respect to apertures 33 regardless of the inward extension of the pins during assembly.

To assemble the armrest 30 to bracket 20, it is only necessary to move the armrest into the bracket in a direction indicated by arrow B in FIGS. 1 and 2 while aligning pins 38 with channels 27 and urging the armrest toward bracket 20 until the pins, which compress inwardly during the insertion of the armrest, snap outwardly into apertures 28 in bracket 20. The positioning of stop tabs 29 is such that this occurs when the leading edge of flanges 31 engage the stop tabs with pins 38 aligned with apertures 28. The outwardly bent tips 23 of legs 24 and 26 also facilitate the insertion of the armrest into its mounting bracket. The armrest, once inserted into the mounting bracket 20, can be pivoted between a lowered position shown in FIG. 1 to a raised stored position between the seats or within a recess formed in adjoining seat backs for storage. The use of the spring-loaded pins 38 also allow the easy removal of the armrest, if necessary, by pushing them inwardly through apertures 28 in bracket 20 while urging the armrest away from the bracket.

In some installations, it may be desirable to provide an additional torque control such as disclosed in U.S. Pat. No. 4,953,259, the disclosure of which is incorporated herein by reference, between the mounting bracket legs 24, 26 and armrest flanges 31 to provide detented torque control of the armrest movement. In addition, the brackets can be manufactured, if desired, with spring-loaded pins utilizing individual springs and pins extending from end legs 24, 26 and with mounting tube 34 including apertures for receiving the spring-loaded pins. Thus, the reversal of the pins and apertures can be provided, although in the preferred embodiment, a single spring is mounted within the cylindrical mounting tube 34.

It will become apparent to those skilled in the art that various modifications to the preferred embodiments of the invention as described herein can be made without departing from the spirit or scope of the invention as defined by the appended claims.

The invention claimed is:

1. An armrest mounting system comprising:

an armrest having a generally rectangular frame, a section of said generally rectangular frame being generally U-shaped and tubular in cross section, a mounting member extending from said generally U-shaped section of said frame said mounting member including one of a pair of spring-loaded pins extending outwardly therefrom and a pair of end apertures; and a generally U-shaped bracket including legs having the other of a pair of spring-loaded pins and apertures formed therein for snap-in pivot mounting of said armrest to said bracket.

2. The armrest mounting system as defined in claim 1 wherein said spring-loaded pins extend from said mounting member.

3. The armrest mounting system as defined in claim 2 wherein said mounting member comprises a hollow tube.

4. The armrest mounting system as defined in claim 3 wherein said tube includes a compression spring mounted therein and engaging said pins for urging said pins outwardly.

5. The armrest mounting system as defined in claim 4 wherein said tube is cylindrical.

6. The armrest mounting system as defined in claim 1 wherein said bracket includes said apertures and said legs further include channels extending from ends of said legs of said bracket into communication with said apertures.

7. The armrest mounting system as defined in claim 6 and further including a stop tab mounted on each of said legs of said bracket adjacent said aperture on a side opposite said channel.

8. The armrest mounting system as defined in claim 7 wherein ends of said legs are deformed outwardly from one another.

9. The armrest mounting system as defined in claim 8 wherein each of said pins comprise a small cylindrical section extending through an aperture in an end of said cylindrical mounting tube and a larger cylindrical section slideably fitted within said cylindrical tube.

10. An armrest comprising:

an armrest body including a generally rectangular frame member having a padded upholstered cover, said frame member having a generally U-shaped section, said generally U-shaped section having a tubular cross section, said frame member being coupled to a mounting member extending from one end of said armrest body, said mounting member including a compression spring and a pair of pins extending outwardly from ends of said mounting member and cooperating with said compression spring to define spring-loaded pivot axles for said armrest; and a generally U-shaped bracket including a pair of spaced-apart legs having apertures formed therein for receiving said spring-loaded pins of said armrest body to snap-fit said armrest body to said bracket.

11. The armrest as defined in claim 10 wherein said frame member comprises a U-shaped frame and said armrest further includes flanges coupling the ends of said U-shaped frame to opposite ends of said mounting member.

12. The armrest as defined in claim 11 wherein said mounting member comprises a hollow tube and said compression spring is mounted within said tube.

13. The armrest as defined in claim 12 wherein said tube is cylindrical.

14. The armrest as defined in claim 13 wherein said legs of said bracket further include channels extending from ends of said legs into communication with said apertures.

15. The armrest as defined in claim 14 and further including a stop tab mounted on each of said legs of said bracket adjacent said aperture on a side opposite said channel.

16. The armrest as defined in claim 15 wherein ends of said legs are deformed outwardly from one another to guide said pins into said bracket.

17. An armrest comprising:

an armrest defined by an upholstered body having a generally rectangular frame and a cylindrical mounting tube extending from one end thereof, said tube including a compression spring centrally located therein and a pair of pivot pins slideably extending outwardly to define spring-loaded pivot axles for said armrest, said frame including a generally U-shaped section having a tubular cross section; and a generally U-shaped bracket including spaced-apart legs having apertures formed therein for receiving said spring-loaded pins of said armrest, said legs of said U-shaped bracket including channels extending from an end of each of said legs, said channels being in communication with said apertures.

18. The armrest as defined in claim 17 and further including a stop tab mounted on each of said legs of said bracket adjacent each of said apertures on a side opposite of said channels.

19. The armrest as defined in claim 18 wherein each of said pins comprise a small cylindrical section extending through an aperture in an end of said cylindrical mounting tube and a larger cylindrical section slideably fitted within said cylindrical tube.

* * * * *